Figure 1:
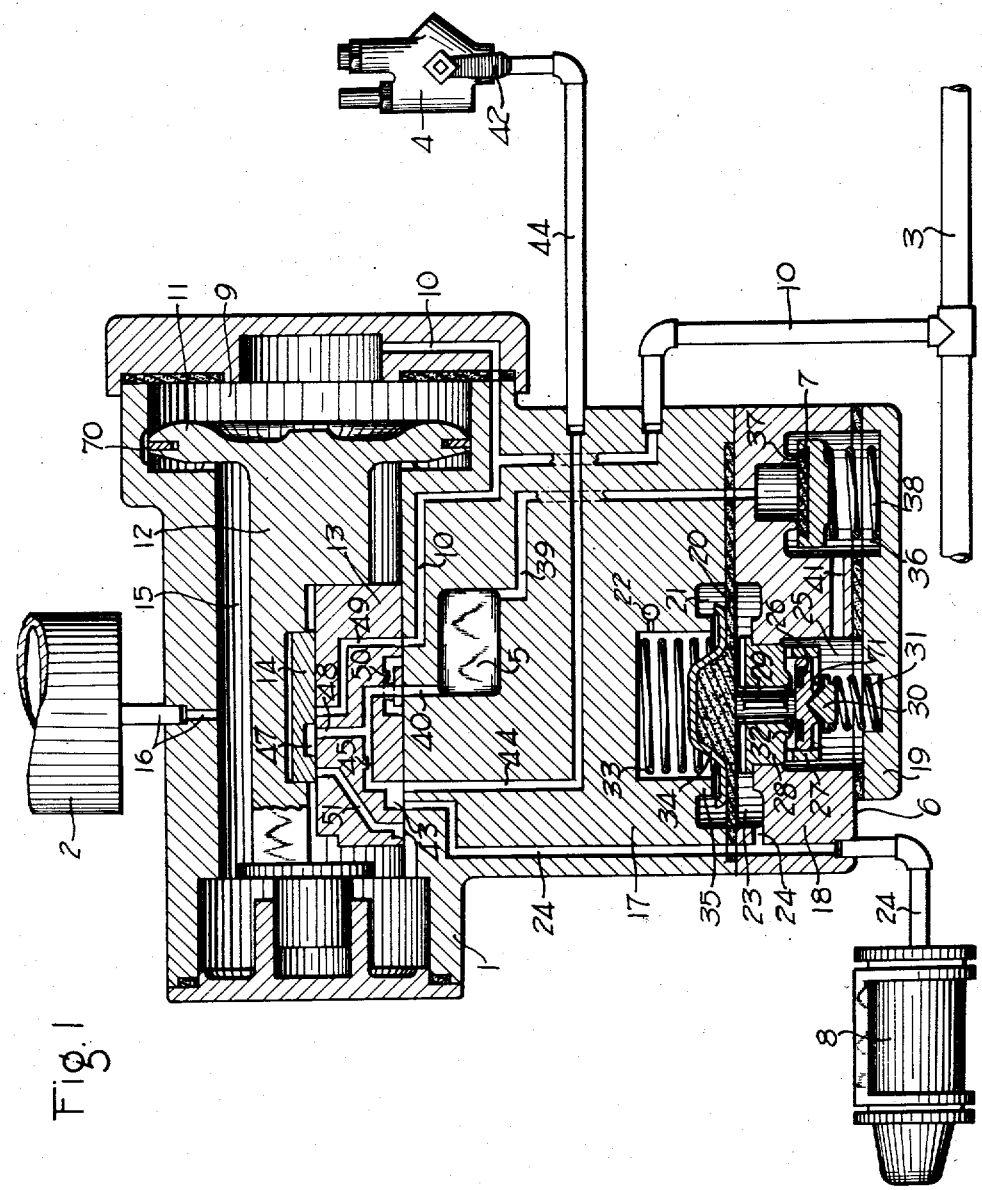

March 17, 1936.　　　G. T. McCLURE　　　2,034,307
FLUID PRESSURE BRAKE
Filed Dec. 11, 1931　　　2 Sheets-Sheet 1

INVENTOR.
GLENN T McCLURE
BY *Wm. M. Cady*
ATTORNEY.

March 17, 1936.  G. T. McCLURE  2,034,307
FLUID PRESSURE BRAKE
Filed Dec. 11, 1931   2 Sheets-Sheet 2

INVENTOR
GLENN T. McCLURE
BY *Wm. M. Cady*
ATTORNEY

Patented Mar. 17, 1936

2,034,307

UNITED STATES PATENT OFFICE 2,034,307

FLUID PRESSURE BRAKE

Glenn T. McClure, Wilmerding, Pa., assignor to The Westinghouse Air Brake Company, Wilmerding, Pa., a corporation of Pennsylvania Application December 11, 1931, Serial No. 580,358

10 Claims. (Cl. 303—38)

This invention relates to fluid pressure brake equipments and more particularly to that type which operates according to variations in brake pipe pressure to control the application and release of the brakes and which, in effecting an application of the brakes, functions to vent fluid under pressure from the brake pipe to propagate quick service action serially throughout the length of a train.

In making an application of the brakes on a train, it is the usual practice to effect an initial light reduction in brake pipe pressure, causing the equipment to function to effect a light application of the brakes. The purpose of this light application of the brakes is to permit the usual slack in the train to run in or gather. After the slack has gathered, a further reduction in brake pipe pressure is effected, causing the braking force on the train to be increased.

It is well known, that with the brake equipment on a long train charged with fluid at the pressure normally carried, the brake pipe pressure on the cars at the head end of the train will be considerably higher than on the cars at the rear end of the train, due to the usual brake pipe leakage, that is to say, there will be a brake pipe gradient from the front end of the train toward the rear of the train. Due to this brake pipe gradient, when the usual brake equipment having means for locally venting fluid from the brake pipe is operated upon a light reduction in brake pipe pressure to initiate an application of the brakes, a greater amount of fluid will be locally vented from the brake pipe on the cars at the head end of the train than will be vented from the brake pipe on the cars at the rear end of the train, consequently a higher brake cylinder pressure will be developed on the cars at the head end of the train than will be developed on the cars at the rear end of the train, so that the slack in the train is liable to run in harshly and cause heavy damaging shocks.

The principal object of my invention is to provide a fluid pressure brake equipment of the before mentioned type having means operative according to brake cylinder pressure to control the quick service venting of fluid under pressure from the brake pipe so as to provide a substantially uniform brake cylinder pressure on all of the cars of the train when a light reduction in brake pipe pressure is effected, thus effectively preventing the harsh run in of the slack in the train.

Another object of my invention is to provide a fluid pressure brake equipment of the before mentioned type having means operable in effecting an application of the brakes for modifying the quick service venting of fluid under pressure from the brake pipe according to a predetermined brake cylinder pressure.

A further object of the invention is to provide a fluid pressure brake equipment of the before mentioned type having means for modifying the quick service venting of fluid under pressure from the brake pipe according to a predetermined brake cylinder pressure and for maintaining the brake cylinder pressure at said predetermined pressure against leakage of fluid under pressure from the brake cylinder.

Other objects and advantages will appear in the following more detailed description of my invention.

Figure 2:
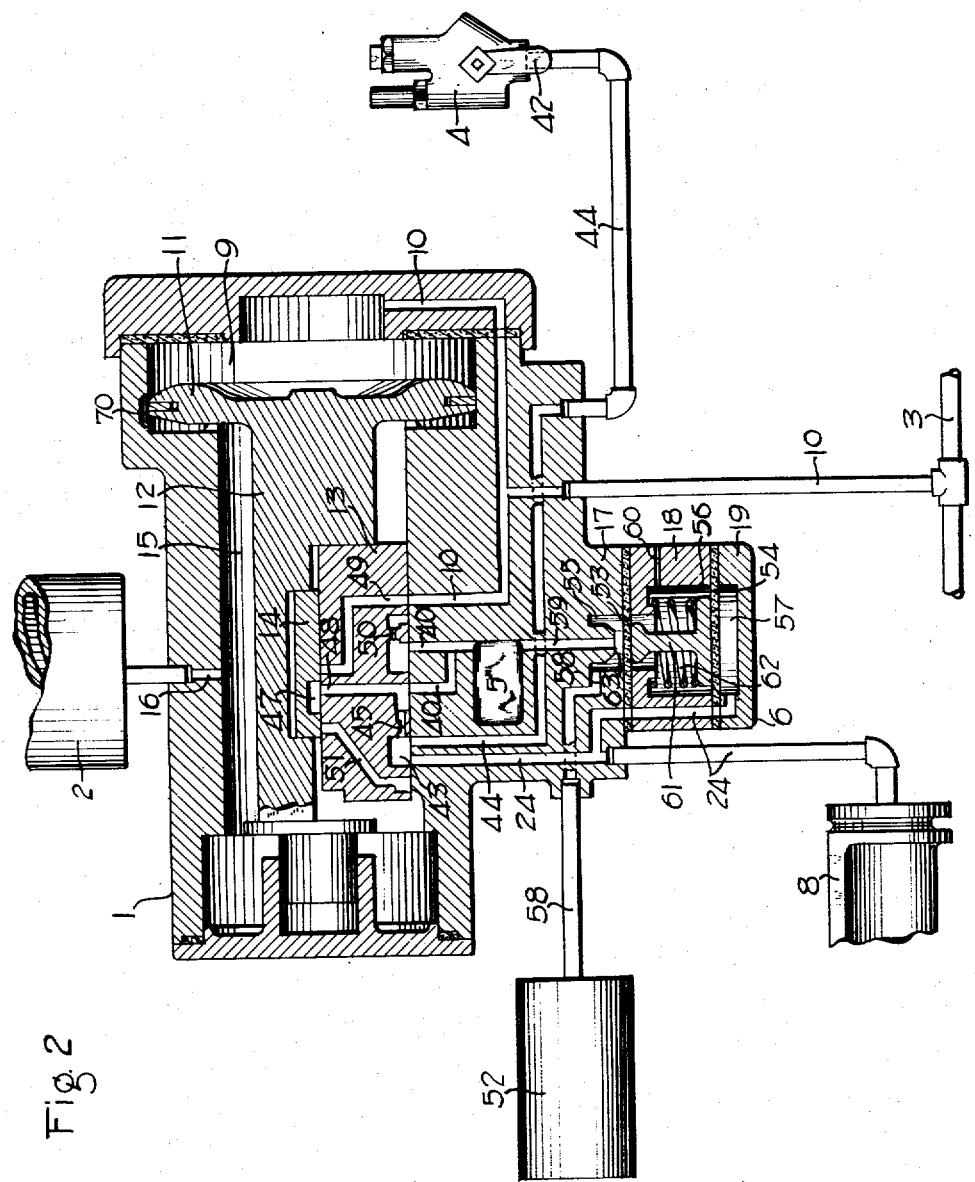

In the accompanying drawings; Fig. 1 is a diagrammatic view, mainly in section, of a fluid pressure brake equipment embodying the invention; and Fig. 2 is a similar view of a brake equipment embodying a modification of the invention.

According to my invention, the equipment may comprise a brake controlling valve device such as a triple valve device, which when a reduction in brake pipe pressure is made through the manipulation of the usual brake valve device, functions to effect a local reduction in brake pipe pressure and also comprises a quick service modifying valve device which operates according to brake cylinder pressure to control the local venting of fluid from the brake pipe to provide a substantially uniform brake cylinder pressure on all of the cars of the train when a light reduction in brake pipe pressure is effected.

As shown in Fig. 1 of the drawings, the fluid pressure brake equipment may comprise a triple valve device 1, an auxiliary reservoir 2, a brake pipe 3, a brake cylinder pressure retaining valve device 4, a quick service chamber 5, a quick service modifying valve device 6, a check valve 7 and a brake cylinder 8.

The triple valve device 1 may comprise a casing having a piston chamber 9 which is connected to the brake pipe 3 through a passage and pipe 10 and contains a piston 11 having a stem 12 adapted to operate a main slide valve 13 and an auxiliary slide valve 14 contained in a chamber 15 which is connected to the auxiliary reservoir 2 through a passage and pipe 16 and which when the piston 11 is in release position, as shown, is connected with the piston chamber 9 through the usual feed groove 10 around the piston.

The quick service modifying valve device 6 may comprise casing sections 17, 18, and 19 which may be secured together by any desired means, the casing section 17 in the present embodiment of the invention being part of the triple valve casing. Clamped between the casing sections 17 and 18 is a flexible diaphragm 20 having at one side a chamber 21 which is open to the atmosphere through a port 22 and having at the other side a chamber 23 which is open to the brake cylinder 8 through a brake cylinder passage and pipe 24. Contained in a chamber 25, which is defined by the casing sections 18 and 19, is a quick service modifying valve 26 which is slidably mounted in an annular guide 27 carried by a bushing 28 mounted in the casing section 18 and which is adapted to be moved into sealing engagement with an annular seat rib 32 on the bushing 28. This valve is provided with a fluted stem 29 which extends through a central bore in the bushing 28 and engages with one side of the flexible diaphragm 20. The end of the stem is maintained in engagement with the diaphragm by the action of a mechanism comprising a member 30 having a cone-shaped portion which has a point contact with one side of the valve 26 within a recess 71 formed in the valve and also comprises a spring 31 which is interposed between and engages the member 30 and casing section 19. It will be noted that since the member 30 has a point contact with the valve 26, said valve will be free to adjust itself to evenly engage the seat rib 32.

Contained in the chamber 21 is a spring 33 which is interposed between and engages the casing section 17 and a circular metallic plate 34 carried by the diaphragm 20. This plate is adapted to engage with an annular stop rib 35 carried by the casing section 17 to limit the flexing movement of the diaphragm in one direction and serves as a guard to prevent the rib 35 from chafing or otherwise damaging the diaphragm.

The central portion of the diaphragm is made in the form of a truncated cone and the plate 34 is provided with a correspondingly shaped recess adapted to receive the central portion of the diaphragm. It will be noted from an inspection of Fig. 1 that the central portion of the diaphragm will maintain the plate against lateral movement relative to the diaphragm.

The check valve 7 is contained in a chamber 36 defined by the casing sections 17 and 18 and is adapted to be urged into engagement with an annular seat rib 37 by the action of a coil spring 38 contained in the chamber, the inner seated area of the valve being open to the seat for the main slide valve 13 through a passage 39, the quick service chamber 5 and a passage 40. The check valve chamber 36 is connected with the chamber 25 through a passage 41.

The retainer valve device 4 is provided for the purpose of retaining a predetermined pressure in the brake cylinder when the handle 42 of the device is moved from the position in which it is shown to its retaining position. With the handle in the position shown, the device establishes communication through which fluid under pressure may be completely vented from the brake cylinder. This device 4 may be of the usual well known construction, therefore a detailed description of the same is deemed unnecessary.

In charging the equipment, fluid under pressure supplied to the brake pipe 3 in the usual manner, flows to the triple valve piston chamber by way of pipe and passage 10. With the triple valve piston 11 in release position, as shown in Fig. 1, fluid under pressure thus supplied to the piston chamber flows therefrom to the auxiliary reservoir 2 by way of the feed groove 70, valve chamber 15 and passage and pipe 16.

With the triple valve parts in release position, as shown, the brake cylinder 8 is open to the atmosphere through pipe and passage 24, a cavity 43 in the main slide valve 13 of the triple valve device, a passage and pipe 44 and through the retainer valve device 4. Since the chamber 23 in the quick service modifying valve device is in constant communication with the passage 24, it will also be open to the atmosphere and due to this, the action of the spring 33 and flexible diaphragm maintains the valve 26 unseated against the opposing pressure of the spring 31.

Further, with the main slide valve 13 in release position, the quick service chamber 5 is open to the atmosphere through passage 40, a port 48 in the main slide valve, a restricted branch 45 of the port 48 and cavity 43.

When in effecting an application of the brakes, an initial reduction in brake pipe pressure is made, a corresponding reduction in the pressure of fluid in the triple valve piston chamber 9 occurs, so that fluid under pressure in the slide valve chamber 15 causes the triple valve piston 11 to move outwardly from release position toward application position.

The piston 11, as it thus moves, first closes the feed groove 70 and operates the piston stem 12 to shift the auxiliary slide valve 14 relative to the main slide valve 13 until the rear end of the stem operatively engages the rear end of the main slide valve and to then shift both slide valves in unison to application position.

As the auxiliary slide valve 14 is thus shifted relative to the main slide valve and the piston 11 closes the feed groove 70, a cavity 47 in the auxiliary slide valve connects ports 48 and 49 in the main slide valve, the port 48 registering, at the seat for the main slide valve, with the passage 40 and the port 49 registering, at the seat for the main slide valve, with the brake pipe passage 10. With the ports 48 and 49 thus connected, fluid under pressure is vented from the brake pipe to the brake cylinder passage 24 by way of passage 40, quick service chamber 5, passage 39, past the check valve 7, check valve chamber 36, passage 41, chamber 25 in the quick service modifying valve device 6, past the unseated modifying valve 26 and its fluted stem 29, and chamber 23. Fluid under pressure thus vented from the brake pipe to the brake cylinder passage 24 is free to flow to the atmosphere by way of cavity 43, passage and pipe 44 and retainer valve device 4. This venting of fluid from the brake pipe effects a sharp brake pipe reduction in the pressure of fluid in the brake pipe and in the triple valve piston chamber 9, so that the movement of the piston 11 and slide valves 13 and 14 toward application position will be accelerated. This local reduction in brake pipe pressure is also effective on the next car toward the rear of the train, and since the equipment on each car of the train will operate in substantially the same manner, quick service action is rapidly propagated serially throughout the length of the train.

When the main slide 13 is being shifted toward application position, it closes communication from the brake pipe passage 10 to the port 49 so that the initial quick service venting of fluid from the brake pipe is discontinued. Now as the main slide valve nears application position, a restricted port 50 in the main slide valve 13 connects the passages 10 and 40 so that fluid is vented from the brake pipe to the brake cylinder at a restricted rate.

Further, with the triple valve parts in application position, the usual service port 51 in the main slide valve 13, which has been uncovered by the auxiliary slide valve 14 during its initial movement relative to the main slide valve, registers with the brake cylinder passage 24, so that fluid under pressure now flows from the auxiliary reservoir 2 to the brake cylinder 8 through pipe and passage 16, valve chamber 15, port 51 and brake cylinder passage and pipe 24, causing an application of the brakes to be effected.

It will be noted that with the triple valve parts in application position, the local venting of fluid under pressure from the brake pipe is effected at a slower rate than the initial venting so as to prevent surges in the fluid in the brake pipe which might be caused if unrestricted flow were permitted and further, to dampen any surges which may be caused upon effecting the initial local reduction in brake pipe pressure. This second local reduction in brake pipe pressure causes the brakes to be applied with a greater predetermined force.

When, in effecting an application of the brakes as just described, a predetermined fluid pressure is developed in the brake cylinder 8, say for instance a pressure of approximately ten pounds, fluid at brake cylinder pressure in the chamber 23 of the quick service modifying valve device, causes the diaphragm 20 to flex outwardly against the opposing pressure of the spring 33. When the diaphragm thus flexes, the spring 31 acts to seat the modifying valve 26 on the seat rib 32 to close off communication from the chamber 25 to the chamber 23, so that fluid under pressure can no longer flow from the brake pipe 3 to the brake cylinder 8.

It will be seen that, since the quick service modifying valve device 6 operates to cut off the quick service venting of fluid from the brake pipe only when a predetermined brake cylinder pressure is developed, a uniform brake cylinder pressure will be developed throughout the length of the train when a light reduction in brake pipe pressure is effected by the use of the usual brake valve device (not shown) regardless of the differences in brake pipe pressure throughout the length of the train, thus preventing the train slack from running in harshly.

If after a light application of the brakes has been effected, the brake cylinder pressure on any car or cars of the train should reduce by leakage to a point slightly below the value of the spring 33, of the modifying valve device 6, said spring will act to flex the diaphragm 20 inwardly to its normal position as shown in Fig. 1, unseating the valve 26 against the opposing pressure of the spring 31, so that fluid under pressure will flow from the brake pipe to the brake cylinder by way of the pipe and passage 10, restricted port 50 in the main slide valve, passage 40, quick service chamber 5, passage 39, past the check valve 37, check valve chamber 36, passage 41, valve chamber 25 in the modifying valve device 6, past the unseated valve 26 and its fluted stem 29, chamber 23 and passage and pipe 24. Fluid under pressure will continue to thus flow to the brake cylinder until the brake cylinder pressure is increased sufficiently to cause the modifying valve device to operate to close the communication from the brake pipe to the brake cylinder, thus maintaining brake cylinder pressure against leakage.

When, after a light reduction in brake pipe pressure has been effected and the brake valve device is moved to lap position in the usual well known manner, the pressure of fluid in the valve chamber 15 of the triple valve device and auxiliary reservoir is reduced by the flow of fluid therefrom to the brake cylinder 8, to a point slightly below the pressure of fluid in the piston chamber 9, the triple valve piston 11 will be caused to move inwardly, shifting the auxiliary slide valve 14 relative to the main slide valve 13 to cover the service port 51, thus closing off the further flow of fluid to the brake cylinder. With the flow of fluid to the brake cylinder thus closed off, the piston 11 will come to a stop when the stem 12 thereof engages the front end of main slide vlave 13.

Now if a further reduction in brake pipe pressure is effected, the triple valve piston 11 will move from lap position to application position, shifting the auxiliary slide valve 14 to again uncover the service port 51, so that fluid under pressure will again flow from the auxiliary reservoir 2 to the brake cylinder 8 and thus increase brake cylinder pressure.

It will here be noted that since the quick service modifying valve device 6 functions to close the communication from the brake pipe to the brake cylinder when the brake cylinder pressure developed is approximately ten pounds upon the effecting of the initial light reduction in brake pipe pressure, no quick service action will occur when the triple valve piston and slide valve 14 move from service lap to application position.

To release the brakes, fluid under pressure is again supplied to the brake pipe 3 in the usual well known manner. Fluid under pressure thus supplied to the brake pipe, flows to the triple valve piston chamber 9 and causes the piston 11 to move inwardly, uncovering the feed groove 17 and shifting the slide valves 13 and 14 to release position in which fluid under pressure is released from the brake cylinder 8 through pipe and passage 24, cavity 43 in the main slide valve 13, passage and pipe 44 and retainer valve device 4. When the brake cylinder pressure has reduced to approximately ten pounds, the spring 33 of the modifying valve device 6 acts to flex the diaphragm 20 inwardly to its normal position, as shown in Fig. 1, unseating the valve 26 against the opposing pressure of the spring 31, thus again establishing communication from the seat of the main slide valve 13 to the brake cylinder.

If in effecting an application of the brakes, the brake pipe should be reduced below brake cylinder pressure, as in effecting an over-reduction in brake pipe pressure, the check valve 7 will prevent back flow of fluid from the brake cylinder to the brake pipe, thus preventing an unintentional reduction in brake cylinder pressure.

If it is desired to retain pressure in the brake cylinder 8, as when operating the train on a descending grade, the handle of the retaining valve device 4 is turned from the position in which it is shown to a position in which the device operates to retain a predetermined pressure in the brake cylinder. Now when the brake pipe pressure is reduced to effect the first application of the brakes on the descending grade, the triple valve parts will be shifted to service position and the brakes will be applied. When the triple valve parts are thus moved, fluid under pressure will be locally vented from the brake pipe in the same manner as before described in connection with a service application of the brakes. When the brake cylinder pressure has increased to substantially ten pounds, the quick service modifying valve device 6 operates, as before described, to close off the local venting of fluid from the brake pipe. Now when the brake pipe pressure is increased and the triple valve parts are caused to move to release position, fluid under pressure is vented from the brake cylinder 8, chamber 23 and quick service chamber 5, the retainer valve device 4 operating to retain a predetermined pressure in the brake cylinder and consequently in the chambers 5 and 23. The pressure retained in the brake cylinder is usually above ten pounds and due to this, the quick service modifying valve device 6 will maintain closed the communication from the quick service chamber 5 to the brake cylinder passage 24, so that upon effecting a succeeding application of the brakes the quick service venting of fluid from the brake pipe will be to the quick service chamber 5 only and the degree of reduction in brake pipe pressure due to such venting, will be limited according to the retained brake cylinder pressure.

It will thus be seen that upon effecting successive reductions in brake pipe pressure in applying the brakes in cycling, the modifying valve device will prevent the flow of fluid from the brake pipe to the brake cylinder and therefore modifies the quick service action of the equipment.

In Fig. 2 a modification of the equipment is illustrated which differs from the equipment shown in Fig. 1 in the construction of the quick service modifying valve device and in that the initial local venting of fluid in effecting an application of the brakes is from the brake pipe to the quick service chamber 5 and a second quick service chamber or reservoir 52 instead of to the quick service chamber 5 and brake cylinder 8. A further difference resides in the omission of the check valve 7.

In this form of the equipment the quick service modifying valve device 6 comprises spaced flexible diaphragms 53 and 54, the diaphragm 53 being adapted to serve as a valve and being of less area than the diaphragm 54. The diaphragm 53 is clamped between the casing sections 17 and 18 and the diaphragm 54 is clamped between the casing sections 18 and 19.

These diaphragms, together with the casing sections 17, 18 and 19 define chambers 55, 56, and 57. The chamber 55 is connected to the quick service reservoir 52 through a passage and pipe 58 and is normally open to a passage 59 leading from the quick service chamber 5. The chamber 56 is open to the atmosphere through a passage 60 and the chamber 57 is open to the brake cylinder passage 24.

Contained in the chamber 56 and interposed between and operatively engaging the inner faces of the flexible diaphragms 53 and 54 is a follower member 61 which is subject to the pressure of a coil spring 62 interposed between and seating on the follower member and casing section 18.

With this modified form of equipment, when a reduction in brake pipe pressure is effected to make an application of the brakes, fluid under pressure is initially vented from the brake pipe to the quick service reservoir 52 by way of pipe and passage 10, port 49 in the main slide valve 13, cavity 47 in the auxiliary slide valve 14, port 48 in the main slide valve, passage 40, quick service chamber 5, passage 59, chamber 55 in the quick service modifying valve device 6 and passage and pipe 58. When the triple valve parts move to application position, the second quick service venting of fluid from the brake pipe to the quick service chamber 5 and reservoir 52 is through the restricted port or cavity 50 in the main slide valve. Now when the brake cylinder pressure has increased to approximately ten pounds, the fluid in the chamber 57, of the modifying valve device, which is at brake cylinder pressure, causes the diaphragm 54 to flex outwardly, moving the follower member 61 against the opposing pressure of the spring 62. This movement of the follower member causes the diaphragm 53 to flex into sealing engagement with a seat rib 63 to close off communication from the passage 59 to the quick service reservoir 52 so that fluid will no longer flow from the brake pipe to the quick service reservoir.

In cycling the brakes on a descending grade, the equipment will function as just described when the first application of the brakes is effected and upon subsequent applications, the quick service modifying valve device will be held closed by the pressure of fluid retained in the brake cylinder by the retainer valve device 4 so that the local venting of fluid from the brake pipe will be according to the brake cylinder pressure retained in the brake cylinder and quick service chamber 5.

When the triple valve parts are shifted to release position to release the brakes, fluid under pressure is vented from the brake cylinder and quick service chamber 5 to the atmosphere in substantially the same manner as before described in connection with the equipment shown in Fig. 1. Now when the brake cylinder pressure has reduced to a point slightly below ten pounds, the spring 62 acts to move the follower member 61 inwardly, permitting the diaphragm valve 53 to move out of sealing engagement with the seat rib 63, thus again establishing communication from the quick service reservoir 52 to the passage 59, so that fluid under pressure is now discharged from the reservoir to the atmosphere by way of pipe and passage 58, chamber 53 in the modifying valve device, passage 59, quick service chamber 5, passage 40, port 48 in the main slide valve 13, restricted branch port 45, cavity 43, brake cylinder exhaust passage and pipe 44 and retainer valve device 4.

From the foregoing description it will be seen that in both forms of my invention the quick service modifying valve device 6 operates to modify the local quick service venting of fluid under pressure from the brake pipe according to a predetermined local brake cylinder pressure so that upon a light reduction in brake pipe pressure, the brake cylinder pressure resulting from said local venting will be substantially uniform on all of the cars of the train.

It will be understood that the feature of limiting the quick service flow of fluid from the brake pipe according to a predetermined brake cylinder pressure is broadly covered in an application of Clyde C. Farmer, Serial No. 612,465, filed May 20, 1932, and that the claims in the present application which relate to this feature are limited to cover specifically my invention.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a brake pipe and a brake cylinder, of a brake controlling valve device operative upon a reduction in brake pipe pressure to first establish communication through which fluid under pressure is locally vented from the brake pipe at a fast rate and then operative to close said communication and to establish a communication through which fluid under pressure is locally vented from the brake pipe at a slower rate and to also establish communication through which fluid under pressure is supplied to the brake cylinder to effect an application of the brakes, and means for modifying the local venting of fluid under pressure from the brake pipe according to a predetermined brake cylinder pressure.

2. In a fluid pressure brake, the combination with a brake pipe and a brake cylinder of a brake controlling valve device operative upon a reduction in brake pipe pressure to first establish communication through which fluid under pressure is locally vented from the brake pipe to the brake cylinder at a fast rate and then operative to close said communication and to establish a communication through which fluid under pressure is locally vented from the brake pipe to the brake cylinder at a slower rate and to also establish communication through which fluid under pressure is supplied to the brake cylinder to effect an application of the brakes, and means controlled according to a predetermined brake cylinder pressure to regulate the local venting of fluid under pressure from the brake pipe to the brake cylinder.

3. In a fluid pressure brake, the combination with a brake pipe and a brake cylinder, of a brake controlling valve device operative upon a reduction in brake pipe pressure to first establish communication through which fluid under pressure is locally vented from the brake pipe at a fast rate and then operative to close said communication and to establish a communication through which fluid under pressure is locally vented from the brake pipe at a slower rate and to also establish communication through which fluid under pressure is supplied to the brake cylinder to effect an application of the brakes, means for modifying the local venting of fluid under pressure from the brake pipe according to a predetermined brake cylinder pressure, and a check valve adapted to prevent back flow of fluid from the brake cylinder to the brake pipe by way of said means.

4. In a fluid pressure brake, the combination with a brake pipe, a brake cylinder and a brake controlling valve device operative upon a reduction in brake pipe pressure to locally vent fluid under pressure from the brake pipe and to supply fluid under pressure to the brake cylinder to effect an application of the brakes, of a valve device for regulating the local flow of fluid from the brake pipe, said valve device comprising a casing having a passage through which fluid vented from the brake pipe is adapted to flow, a valve operative to control the flow of fluid through said passage, means urging said valve to move toward its closed position and having a point engagement with said valve to permit an adjusting movement of the valve relative thereto, and means subject to brake cylinder pressure for controlling the operation of said valve.

5. A valve device comprising a casing having an inlet chamber, an outlet chamber and a passage normally connecting said chambers, a normally open valve operative to close communication through said passage, means for urging said valve to move toward its closed position, a flexible diaphragm in operative engagement with said valve and having an outwardly extending thickened central portion, a plate having a recessed central portion fitting over the thickened central portion of the diaphragm and maintained against lateral movement relative to the diaphragm by said thickened central portion, and a spring interposed between and operatively engaging said casing and plate for maintaining said valve open against the action of said means, said diaphragm being operative upon the development of a predetermined pressure in said outlet chamber to permit said valve to be seated by the action of said means, and a stop carried by said casing with which said plate engages to limit the outward flexing movement of said diaphragm.

6. In a fluid pressure brake equipment, the combination with a brake pipe, a brake cylinder and an unrestricted brake cylinder exhaust passage, of a brake controlling valve device normally establishing an unrestricted communication from the brake cylinder to said exhaust passage and operated upon a reduction in brake pipe pressure to effect an application of the brakes, said valve device being operative upon initial movement toward application position for connecting the brake pipe to said unrestricted communication and brake cylinder exhaust passage to vent fluid under pressure from the brake pipe to the atmosphere to effect a local quick service reduction in brake pipe pressure.

7. In a fluid pressure brake equipment, the combination with a brake pipe, a brake cylinder and an unrestricted brake cylinder exhaust passage, of a brake controlling valve device normally establishing an unrestricted communication from the brake cylinder to said exhaust passage and operated upon a reduction in brake pipe pressure to effect an application of the brakes, said valve device being operative upon initial movement toward application position for connecting the brake pipe to said unrestricted communication and brake cylinder exhaust passage to vent fluid under pressure from the brake pipe to the atmosphere and operative in application position to vent fluid under pressure from the brake pipe to the brake cylinder at a restricted rate.

8. In a fluid pressure brake equipment, the combination with a brake pipe, a brake cylinder and an unrestricted brake cylinder exhaust passage, of a brake controlling valve device normally establishing an unrestricted communication from the brake cylinder to said exhaust passage and operated upon a reduction in brake pipe pressure to effect an application of the brakes, said valve device being operative upon initial movement toward application position for connecting the brake pipe to said unrestricted communication and brake cylinder exhaust passage to vent fluid under pressure from the brake pipe to the atmosphere and operative in application position to vent fluid under pressure from the brake pipe to the brake cylinder at a restricted rate, and means for limiting the amount of fluid under pressure vented from the brake pipe according to a predetermined brake cylinder pressure.

9. In a fluid pressure brake, the combination with a brake pipe and a brake cylinder, of a quick service reservoir normally connected to the brake cylinder, a brake controlling valve device normally connecting said reservoir to the atmosphere and operative upon a reduction in brake pipe pressure to first vent fluid under pressure from the brake pipe to the atmosphere and through the quick service reservoir to the brake cylinder and for then closing the connection from the reservoir to the atmosphere and supplying fluid under pressure to the brake cylinder to effect an application of the brakes, and means interposed between the reservoir and brake cylinder operative upon a predetermined increase in brake cylinder pressure for limiting the quick service flow of fluid from the brake pipe to the brake cylinder.

10. In a fluid pressure brake, the combination with a brake pipe and a brake cylinder, of a quick service reservoir, a brake controlling valve device having a release position in which it establishes a venting communication from the reservoir and brake cylinder, said brake controlling valve device being operative upon a reduction in brake pipe pressure to first vent fluid under pressure from the brake pipe to the brake cylinder and through said venting communication to the atmosphere and to then lap said venting communication, and to finally establish a communication through which fluid is supplied to the brake cylinder to effect an application of the brakes and to establish a communication through which fluid under pressure is vented by way of said reservoir to the brake cylinder, and means interposed between said reservoir and the brake cylinder operative by brake cylinder pressure for limiting the quick service flow of fluid from the brake pipe to the brake cylinder.

GLENN T. McCLURE.

DISCLAIMER 2,034,307.—*Glenn T. McClure*, Wilmerding, Pa. FLUID PRESSURE BRAKE. Patent dated March 17, 1936. Disclaimer filed November 27, 1936, by the patentee; the assignee, *The Westinghouse Air Brake Company*, consenting.
 Hereby enters this disclaimer to claims 1 and 3 of said patent.
 [*Official Gazette December 15, 1936.*]

for then closing the connection from the reservoir to the atmosphere and supplying fluid under pressure to the brake cylinder to effect an application of the brakes, and means interposed between the reservoir and brake cylinder operative upon a predetermined increase in brake cylinder pressure for limiting the quick service flow of fluid from the brake pipe to the brake cylinder.

10. In a fluid pressure brake, the combination with a brake pipe and a brake cylinder, of a quick service reservoir, a brake controlling valve device having a release position in which it establishes a venting communication from the reservoir and brake cylinder, said brake controlling valve device being operative upon a reduction in brake pipe pressure to first vent fluid under pressure from the brake pipe to the brake cylinder and through said venting communication to the atmosphere and to then lap said venting communication, and to finally establish a communication through which fluid is supplied to the brake cylinder to effect an application of the brakes and to establish a communication through which fluid under pressure is vented by way of said reservoir to the brake cylinder, and means interposed between said reservoir and the brake cylinder operative by brake cylinder pressure for limiting the quick service flow of fluid from the brake pipe to the brake cylinder.

GLENN T. McCLURE.

DISCLAIMER 2,034,307.—*Glenn T. McClure*, Wilmerding, Pa. FLUID PRESSURE BRAKE. Patent dated March 17, 1936. Disclaimer filed November 27, 1936, by the patentee; the assignee, *The Westinghouse Air Brake Company*, consenting.

Hereby enters this disclaimer to claims 1 and 3 of said patent.

[*Official Gazette December 15, 1936.*]